United States Patent [19]

Kulzick et al.

[11] Patent Number: 5,359,006
[45] Date of Patent: Oct. 25, 1994

[54] POLY(VINYLALKYLETHER)-CONTAINING HOT MELT ADHESIVES FOR POLYETHLLENE AND POLYPROPYLENE

[75] Inventors: Matthew A. Kulzick, Warrenville; Wayne R. Pretzer; Tsuei-Yun Lynch, both of Wheaton; Paul A. Koning, Aurora, all of Ill.

[73] Assignee: Amoco Corporation, Chicago, Ill.

[21] Appl. No.: 34,152

[22] Filed: Mar. 22, 1993

Related U.S. Application Data

[60] Continuation of Ser. No. 761,258, Sep. 17, 1991, abandoned, which is a division of Ser. No. 689,353, Apr. 22, 1991, Pat. No. 5,080,978, which is a continuation-in-part of Ser. No. 292,413, Dec. 30, 1988, abandoned.

[51] Int. Cl.$^5$ ............... C08L 23/06; C08L 23/10; C08L 29/10; C08L 23/20
[52] U.S. Cl. ................... 525/231; 525/210; 525/206; 525/133; 524/271
[58] Field of Search ............. 525/231, 210, 206, 133; 524/271

[56] References Cited

U.S. PATENT DOCUMENTS 2,567,016  9/1951  Gessler et al. .
2,861,899  11/1958  Sylvester et al. .
3,144,430  8/1964  Schaffhausen .
3,153,680  10/1964  Naita et al. .
3,220,966  11/1965  Flanagan .
3,299,181  1/1967  Coover .
3,341,626  9/1967  Peterkin .
3,356,766  12/1967  Ware .
3,492,372  1/1970  Flanagan .
3,497,574  2/1970  Press .
4,997,881  3/1991  Patel et al. .

FOREIGN PATENT DOCUMENTS 60-173171  9/1985  Japan .

Primary Examiner—Carman J. Seccuro, Jr.
Attorney, Agent, or Firm—Mary Jo Kanady; Wallace L. Oliver

[57] ABSTRACT

Hot-melt adhesives based upon a mixture composed of poly(vinylmethylether), greater than about 10 weight percent of a thermoplastic resin and, optionally a tackifier resin and/or extender, are found to be superior for the binding of polyolefins such as polyethylene, polypropylene, and ethylene-propylene copolymers to themselves and to other substrates. In particular, the hot-melt adhesives are useful for bonding polyethylene-backed and latex-backed carpet to polyethylene, polypropylene, or ethylene-propylene copolymer.

11 Claims, No Drawings

POLY(VINYLALKYLETHER)-CONTAINING HOT MELT ADHESIVES FOR POLYETHLLENE AND POLYPROPYLENE

This is a continuation of application Ser. No. 07/761,258, filed Sep. 17, 1991, now abandoned which is a divisional of Ser. No. 689,353 filed Apr. 22, 1991, now U.S. Pat. No. 5,080,978, which is a continuation-in-part of U.S. Ser. No. 292,413, filed Dec. 30, 1988, now abandoned.

BACKGROUND OF THE INVENTION

This invention relates to improved hot-melt adhesive compositions effective in binding polyolefins to themselves and to other minerals which are based upon a poly(vinylalkylether) and, more particularly, to hot-melt adhesive compositions which strongly bind polyolefins, in particular polyethylene, polypropylene, and ethylene-propylene copolymers, to themselves and other substrates, and which are formulated from a poly(vinylmethylether), a thermoplastic resin, and optionally, a tackifier resin.

Hot-melt adhesives produce a bond between two minerals by cooling of the molten adhesive which is applied to the materials in a meted state. They are distinguishable from those products which require crosslinking or other chemical reactions to achieve ultimate bond strength and from those materials that require loss of solvent or water to achieve the bond strength. Prior to heating, the hot-melt adhesives are solids that can be provided in bulk or in pelletized or rod form for ease of handling. Upon heating, the hot-melt adhesive composition melts rather sharply and flows readily for application to a substrate. Since hot-melt adhesives are thermoplastic rather than thermosetting, and are thus remeltable, they can be applied to a first substrate and later remelted to form a hot-melt bond with a second substrate. Hot-melt adhesives can have considerable advantage over other types of adhesives for a number of uses and have a significant commercial importance.

There are a variety of uses for hot-melt adhesives which are out in the market place. However, while one hot-melt adhesive may be used for bonding in a particular use or application, the same adhesive may be completely unsuitable for other uses or applications. While many satisfactory hot-melt adhesives are available to the art, the art is constantly seeking new compositions having superior performance, lower cost, and/or stronger bonding of the substrate.

Polyethylene, polypropylene, and ethylene-propylene copolymers are widely used in many applications which require adhering these plastics to themselves as well as to other materials. However, adhesives do not form strong bonds to untreated polyolefin surfaces. The difficulties encountered in developing adequate adhesion to polyethylene and polypropylene can be attributed in large part to the non-porous and non-polar characteristics of these materials. In addition, the presence of surface materials such as mold release agents, slip agents, antioxidants, polymerization impurities, and low-molecular-weight, surface polymer further deteriorates surface conditions for adhesion. Various surface preparation procedures, including etching with sodium dichromate-sulfuric acid solution, treating with flame, corona discharge, electron beam, laser light, ultraviolet radiation, hot chlorinated solvent, and applying chemically reactive primers have been developed to afford a polyolefin surface that is more receptive to conventional adhesives. However, such pretreatment adds significant cost to a finished assembly and can reduce the economic incentive to use polyethylene or polypropylene in place of more expensive plastics. Further, some surface treatment procedures, e.g., corona discharge, are only applicable to thin, flat surfaces and cannot be used in many existing applications.

An adhesive which strongly bonds untreated polyethylene, polypropylene, and ethylene-propylene copolymers would represent a significant achievement and present opportunities to not only market a new family of adhesives, but also open many new markets for such polyolefins in the areas of automobiles, appliances, fabrics, etc.

Compatibility of adhesive and substrate is critical if a strong bond is to be formed. An estimate of compatibility can be obtained from the solubility parameters ($\delta$) and critical surface tensions ($\gamma_c$) of the materials of interest. Generally, a good correlation exists between solubility parameter and surface tension for polymers. To form a strong bond, the adhesive should readily wet the surface of the substrate. Polyethylene and polypropylene have $\gamma_c$ values of 31 and 29 dynes/cm and 67 values of 7.7–9.2, while typical adhesives have considerably higher values so little spreading and wetting occurs, giving poor adhesion using these adhesives.

In addition to wetting, the bond between adhesive and substrate will be strong if there is a decrease in the free energy as a result of combining the two. The free energy change will be negative if the heat of mixing, which is positive for most nonpolar and moderately polar pairs, is small. Since the square of the difference of the solubility parameters is proportional to the heat of mixing, it is highly desirable that the solubility parameters for adhesive and substrate be approximately equal.

It follows from the above that poly(vinylmethylether), PVME, is a potentially attractive component in an adhesive formulated to bond to polyolefin surfaces. The critical surface tension of PVME is 29 dynes/cm and the solubility parameter is in the range 8.5–12.7. Comparison of these values with those of polyethylene and polypropylene given above suggests that PVME can wet the polyolefin surface and that the heat of mixing will be small. Both points suggest that PVME could be useful in polyolefin hot-melt adhesives to form strong bonds between the polyolefin and various substrates.

Poly(vinylmethylether) also possesses several other interesting properties that are relevant to its use in adhesive formulations. While atactic, isotactic, and syndiotactic forms of the polymer are known, it is the atactic (amorphous) polymer that is of greatest interest in adhesives. This amorphous material is a very viscous resin (typical number average molecular weight in the neighborhood of 5,000–100,000) and it has a wide solubility range, e.g., it is soluble in water, as well as organic solvents like toluene. This property may be exploited by using PVME as a compatibilizing agent for dissimilar adhesive components. The hydrophilicity of PVME suggests that surface water and moisture should not significantly interfere with bonding. The presence of pendant, polar ether groups provides sites for favorable interaction with other adhesive components and polymer surfaces.

The literature describing the bonding of polyolefins is extensive. Substrate surface treatment and adhesive formulation are the two general approaches the patent literature has taken to improve adherence. In the latter art both hot-melt and pressure-sensitive adhesives are taught. The literature teaching the use of poly(vinylalkylether) as an adhesive component is also broad. For example, a hot-melt adhesive containing poly(vinylmethylether) used to laminate such materials as Kraft paper, burlap, cellophane, cellulose, glass, iron and tin is taught in U.S. Pat. No. 2,970,974.

Conventional adhesives that contain a pitch and a poly(vinylalkylether) fluidized by a solvent, which are considered to operate synergistically, are taught as useful to bind polyolefins in U.S. Pat. No. 3,409,498. The patent further relates that although a broad range of pitch sources produce a suitable adhesive, "Asphalts and other bituminous substances do not produce the same adhesive effects . . . ", which quotation appears at column 3, lines 15–17. Poly(vinylmethylether) is specifically taught as useful in the patent.

Hot-melt, pressure sensitive adhesive compositions consisting of a primary polymer which is a solid, homogeneous and essentially random copolymer of styrene and isobutylene and a secondary polymer which inter alia, can be a poly(vinylalkyl ether) are disclosed in U.S. Pat. No. 3,644,252. The Examples teach their use for adhering polyester.

Now it has been found that by combining poly(vinylmethylether) with a thermoplastic resin and, optionally, a tackifier resin, hot-melt adhesives for polyethylene, polypropylene, and ethylene-propylene copolymers can be formed which bond these substrates strongly and in which the adhesive strength of the bond between adhesive and substrate is generally greater than the cohesive strength of the adhesive.

BRIEF DESCRIPTION OF THE INVENTION

Described herein are hot-melt adhesive compositions useful for binding polyolefins comprising substantially amorphous poly(vinylmethylether) and at least 10 percent by weight of a thermoplastic resin selected from the group consisting of amorphous $C_2$ to $C_6$ polyolefins and copolymers thereof, an ethylene-vinylacetate copolymer, low density polyethylene, polystyrene and block copolymers thereof with isoprene and 1,3-butadiene, and ethylene-alkylacrylate copolymers. In another aspect of the invention, such hot-melt adhesive compositions contain in addition a tackifier resin selected from the group consisting of terpene resins, terpene-phenol resins, coumarone-indene resins, aliphatic and aromatic petroleum resins, hydrogenated petroleum resins, resins made by copolymerization of pure aromatic monomers, a wood rosin and wood rosin esters. In still another aspect, the invention includes bonded structures comprising such hot-melt adhesives and a solid substrate selected from the group consisting of high density polyethylene, low density polyethylene, polypropylene, ethylene-propylene copolymers, polymethylpentene, polycarbonate, latex-backed carpet, polyethylene-backed carpet, high impact polystyrene, galvanized steel, carbon steel, poly(2,6-dimethylphenylene oxide) and blends thereof with polystyrene, and a copolymer of acrylonitrile, butadiene and styrene.

DETAILED DESCRIPTION OF THE INVENTION

The hot-melt adhesives of this invention contain at least two components. The first component is a poly(vinylalkylether), preferably a poly(vinylmethylether), and more particularly, a substantially amorphous poly(vinylmethylether), and the second component is a base resin, a thermoplastic resin selected from the group consisting of $C_2$ to $C_6$ polyolefins and copolymers thereof, such as the amorphous polypropylene Polytac R-1000 made by Crowley Chemical Co., an ethylene-vinylacetate copolymer such as an Ultrathene made by Quantum, a low density polyethylene (PE) such as a Petrothene made by Quantum, polystyrene and block copolymers thereof with isoprene and 1,3-butadiene such as Kraton 1107 made by Shell Chemical Co. and Stereon 840 A made by Firestone and hydrogenated variants (soft block) of such block copolymers, and an ethylene-alkylacrylate copolymer such as a DPD series ethylene-ethylacrylate copolymer made by Union Carbide Co. More preferably, the second component is selected from the group consisting of an amorphous polypropylene (PP), such as Polytac R-1000, amorphous polypropylene to which is added less than about 20 weight percent of crystalline polypropylene, an ethylene-vinylacetate copolymer such as an Ultrathene, or a block styrene/isoprene or block styrene/1,3-butadiene copolymer such Kraton 1107 or Stereon 840A.

Preferably, the amount of thermoplastic resin in a two component or multicomponent adhesive composition is generally at least about 10 percent by weight of the total composition, more preferably, more than about 15 percent by weight and, most preferably, more than about 20 percent by weight of the total composition. In the case where a polystyrene block copolymer is employed as the thermoplastic resin, the amount of resin is at least about 15 percent by weight, and more preferably at least about 20 weight percent of the weight of the total adhesive composition. Where an amorphous polyolefin is the thermoplastic resin, the amount of resin is preferably about 50 weight percent, and more preferably about 75 weight percent, of the total adhesive composition.

Usefully, the hot-melt adhesive contains a third component which is a tackifier resin. The amount of tackifier resin as a percent of the total adhesive is at least about 5 weight percent of the total adhesive composition, more preferably, at least about 10 weight percent, and most preferably, at least about 20 weight percent of the total adhesive composition.

In addition, the adhesive composition can contain a fourth component which is a wax or oil extender. Paraffin waxes such as Sheliwax 200, 300 and 650 and Shellmax 400 and 500 are made by Shell Chemical Company. Other wax extenders include BE Square 175 and 195 made by Petrolite, Polywax 500 and 2000 also made by Petrolite, and Epolene C-10 and C-17 made by Eastman Chemical Company. Oil extenders include Shellflex 371 made by Shell Chemical Company, Kaydol made by Witco Chemical Company and a Tuflo oil made by Mobile Chemical Company. The amount of extender can run between about 10 weight percent and about 70 weight percent of the total adhesive composition. More preferably, the amount of wax or oil extender used is between about 20 and about 60 weight percent of the total adhesive composition.

In general, the amount of poly(vinylmethylether)in the hot-melt adhesive is at least about 10 weight percent of the total adhesive composition, and more preferably, at least about 15 percent of the total adhesive composition.

The poly(vinylalkylethers) which may be employed are polymers which are liquids or semi-solids at room temperature and are characterized by having an inherent viscosity in chloroform within the range of about 0.2 to about 3.0. Preferred is a poly(vinylmethylether) such as Gantrez M-154 which is a product of GAF, Inc.

The compositions of this invention comprise, on the one hand, a combination of a poly(vinylalkylether) and a thermoplastic resin and, on the other hand, such combinations additionally containing a tackifier resin selected from the group consisting of terpene resins, terpene-phenol resins, coumarone-indene resins, aliphatic and aromatic petroleum resins, hydrogenated petroleum resins, resins made by copolymerization of pure aromatic monomers, naturally occurring gum and wood rosins and their synthetic derivatives such as esters. The tackifier resin according to the present invention advantageously imparts hot tack, substrate wetting, and bond strength to the substrate while the hot-melt composition is being applied to the substrate.

The tackifier resins contemplated in the present invention are solid compounds having a softening point above about 75° C. Included within this category of materials are the following substances with their approximate softening points (by the ring and ball method):

| Substance | Softening Pt. (°C.) |
| --- | --- |
| Wood rosin | 80 |
| Gum rosin | 83 |
| Rosin esters derived from either gum or wood rosin such as: | |
| Glycerol esters (ester gums) | 90 |
| Pentaerythritol esters | 115 |
| Hydrogenated rosin | 75 |
| Polymerized rosin | 100 |
| Disproportionated rosin | 80 |
| Polyhydric alcohol derivatives of hydrogenated rosin, e.g.: | |
| Glycerol derivatives | 85 |
| Polyhydroalcohol derivatives of polymerized rosin, e.g.: | |
| Ethylene glycol ester | 82 |
| Glycerol ester | 110 |
| Oxidized rosins | 105 |
| Hydrogenated oxidized rosin esters of oxidized rosin and the like. | |

Any of the common commercial grades of wood or gum rosin may be employed ranging from the "X" and water white grades to the darkest grades (e.g., D-grade). The impurities in the latter which give rise to the color body formation have no significant effect upon the usefulness of the compositions of this invention.

The tackifier resin is advantageously an alpha-methylstyrene, a rosin, or a terpene resin of the alpha-pinene, beta-pinene and d-limonene types. Preferably, the tackifying resin has a ring and ball softening point of 85° to 150° C., more preferably 85° to 135° C., a Gardner color of 2 to 10, and a flashpoint greater than 230° C.

A preferred alpha-methylstyrene tackifier resin of the present invention is commercially available under the trademark "Kristalex 1120." "Kristalex 1120" is a water white, color stable, nonpolar, thermoplastic hydrocarbon resin that is a copolymer of styrene and alpha-methylstyrene, and has a ring and ball softening point of 120° C., a specific gravity of 1.07, and a flashpoint of 232° C.

A preferred rosin type tackifier resin, commercially available under the trademark "Sylvatac 140," is a polymerized rosin with a ring and ball softening point of 140° C., a Gardner color of 10, an acid number of 135, a saponification number of 140 and a specific gravity of 1.08.

Suitable hydrocarbon tackifier resins can be a hydrocarbon resin such as DAC-B hydrocarbon resin prepared according to the process disclosed in U.S. Pat. No. 3,701,760 as well as other hydrocarbon resins, polyterpenes or synthetic polyterpenes, and the like. One such hydrocarbon tackifying resin is a hydrocarbon resin having a softening point of about 100° C. and available commercially as Eastotac H-100 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifier resins typically exhibit a ring and ball softening point of from about 80° C. to about 135° C.; an acid number of from about 0–2; a saponification value of less than about 1; and an iodine value of from about 30 to 100, Examples of such commercially available resins of this type are "Wingtack" 95 and "Wingtack" 115 tackifying resins sold by the Goodyear Tire and Rubber Company, the Sta-Tac and Betaprene A or H resins sold by the Reichold Chemical Corporation, Arkon resins sold by Arakawa Forest Chemical Industries, and Escorez resins sold by Exxon Chemical Co.

Additional suitable resins are the terpene polymers such as the polymeric, resinous materials obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Commercially available resins of the terpene type include the Zonarez terpene B-Series, the 7000 Series resins from Arizona Chemical Corp., and Nirez resins from Reichold Chemical Corp. Typical properties reported for the Zonarez terpene resins include ring and ball softening point of about 55° to 125° C. (ASTM E-28-67), color of 2 to 3 (Gardner 1963, 50% in heptane), acid number of less than 1 (ASTM D465-59), saponification number of less than 1 (ASTM D464-59), and specific gravity at 25° C. of 0.96 to 0.99 (ASTM D1963-61).

By virtue, therefore, of the combination of the poly(vinylmethylether) with the hydrocarbon and tackifier resins, it is possible to provide hot-melt adhesive compositions which give excellent adhesive bonds quickly, which bonds are not subject to deterioration when exposed to conditions of high humidity or water immersion or the like.

Other ingredients may be included in the hot-melt composition according to the present invention.

For example, a silane adhesion promoter can be advantageously included. A polyunsaturated polyalkoxysilane, 50% in siloxane, is commercially available under the trademark "CPS078 6S". Other silanes may also be used as adhesion promoters.

Anionic and nonionic wetting agents that are stable at normal hot-melt application temperatures may also be used. An example of a suitable wetting agent is sodium dioctyl sulfosuccinate.

An antioxidant is also advantageously included to control the aging of the composition. A preferred antioxidant is the 3,5-di-tert-butyl-4-hydroxyhydrocinamic acid triester of 1,3,5-tris-(2-hydroxyethyl)-s-triazine-2,4,6-(1H,3H,5H) trione with a molecular weight of 1042 commercially available under the trademark "Vanox SKT." Antioxidants that are also effective include, for example, tris(di-t-butyl-p-hydroxybenzyl)-trimethylbenzene (Lonox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene(3,5-di-tert-butyl-4-hydroxyhydrocinnamate) methane] (Irganox 1010), lauryl stearyl thiodipropionate (Plastanox 1212), and dilauryl 3,3'-thiodipropionate (Plastanox LTDP), 2,6-di-tert-butyl-p-cresol (BHT) and the like. Such materials, if present, are used in relatively small amounts as may be understood by one skilled in the art.

Additives such as nucleating agents, pigments, colorants, fillers, solvents, and the like can also be added to the adhesive compositions of the present invention.

An effective amount of crystalline polypropylene, for example, up to about 15 weight percent of the amorphous polypropylene used may be included in the thermoplastic resin portion of the hot-melt composition to improve the cohesive properties of hot-melts made using amorphous polypropylene.

The adhesive compositions of this invention are prepared by blending together the adhesive components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions. Solvents such as hexane, heptane, mineral spidts, xylene, toluene, benzene, chlorinated hydrocarbons, etc., are not needed to prepare the compositions of this invention; however, they can be used if desired.

The adhesive compositions of this invention, which are essentially 100 percent solids, have a melt viscosity in the range of about 100 to about 150,000 centipoise at 177° C.

The adhesive compositions of this invention can be used for any use to which adhesives have been put as can be understood by one skilled in the art. While use for hot-melt adhesives is preferred, the compositions also may be used in water-borne, pressure-sensitive adhesives. In particular, the inventive compositions are able to strongly bond polyolefins and their copolymers, preferred polyolefins are polyethylene, polypropylene, and ethylene-propylene copolymers, to themselves and to other substrates such that failure of the interfacial bond is generally cohesive rather than interfacial. Substrates which are useful to bond to the polyolefin or polyolefin copolymer include high density polyethylene, low density polyethylene, polypropylene, ethylene-propylene copolymers, polymethyl-pentene, polycarbonate, latex-backed carpet, polyethylene-backed carpet, high impact polystyrene, galvanized steel, carbon steel, aluminum, paper, glass, polyethylene terephthalate, poly(2,6-dimethylphenylene oxide) and blends thereof with polystyrene, a copolymer of acetonitrile, butadiene, styrene, and the like. More preferably, substrates such as high density and low density polyethylene, polypropylene, ethylene-propylene copolymer, polycarbonate, latex-backed carpet and polyethylene-backed carpet, aluminum, paper, and polyethylene terephthalate are used.

The following Examples will serve to illustrate certain specific embodiments of the herein disclosed invention. These Examples should not, however, be construed as limiting the scope of the novel invention, as there are many variations which may be made thereon without departing from the spirit of the disclosed invention, as those of skill in the art will recognize.

EXAMPLES

General

Adhesive Strength Testing

Lap shear strength was measured by a test based upon ASTMD-1002-72. Lap shear assemblies were prepared from two 1 in×6 in×⅛ in strips of specified substrate (e.g., polypropylene, polyethylene, high impact polystyrene, etc.). The assembly was prepared by dispensing hot-melt adhesive from an appropriate applicator onto the end of one test strip and then overlapping a second strip on top of the first. The area of overlap is one square inch. A 5 lb weight was immediately rolled twice over the bonded joint. Spacers or a jig are used to set the bond thickness.

Lap shear strength was measured by a tensile test machine, such as an Instron Model 4201 using a tension load cell of 1000 lbs and a crosshead speed of 2 in/min.

Peel strength was measured by the Pressure Sensitive Tape Council Method PSTC #1 contained in its 9th edition and last revised in August 1989.

Experimental Adhesive Formulation

A representative hot-melt formulation is listed below and was prepared in the following manner:
50 g poly(vinylmethylether) (Gantrez M-1 54, 50% water)
25 g polyterpene (Zonarez B-115)
50 g ethylene-vinylacetate copolymer (USI UE 612-04, melt index of 150)

The poly(vinylmethylether) (PVME) was first weighed into a 500 ml resin kettle and then the remaining components were added. The kettle was placed overnight in an oven set at 105°–115° C. The oven had a nitrogen purge allowing the water vapor from the PVME to be removed. The next day the kettle was removed from the oven and cooled to room temperature under a blanket of nitrogen. When cooled, the kettle was equipped with a cover, stirring shaft, paddle, Truebore bearing, mechanical stirrer and a nitrogen purge. The kettle was put into a silicone oil bath that was controlled by a TIC and TIS control box at 175° C. Stirring began when the formulation softened. If a formulation did not blend well, the temperature was raised to 200° C. Once the formulation was completely blended, the kettle was raised out of the oil bath and tilted to one side causing the formulation to flow slowly along the side of the kettle. When the formulation cooled, it was then removed from the kettle.

Adhesives Application to Polypropylene Strips

A small amount of the hot-melt formulation was placed in a Mini-Squirt hot-melt glue gun (Slautterback Corporation Model 71026). The gun was heated to 200° C. Using polypropylene sticks wiped once with hexane, the hot-melt was added to a 1 inch square area of the bottom strip. Then the top strip was placed on top of the hot-melt area and pressed in place with a 5 kg weight. The thickness of the hot-melt was determined by the size of the spacer used. The bonded strips were cooled for a few minutes before the weight was removed and were cured overnight at room temperature.

EXAMPLE 1

Vadous hot-melt adhesives were made by hot mixing 25 weight percent of Gantrez M-154, an amorphous poly(vinylmethylether) purchased from GAF, Inc., 50 percent by weight of base resin, and 25 weight percent of Zonarez B-115, a tackifier resin purchased from Arizona Chemical Co. The results of lap shear strength tests on structures formed by bonding two 1 in × 6 in × ⅛ in polypropylene stdps treated with the hot-melt adhesives is shown below.

TABLE 1

| Thermoplastic Resin | Lap shear strength (psi) | Failure Mode |
|---|---|---|
| EVA[1] | 221 | C[2] |
| LDPE[3] | 257 | C |
| Amorphous polypropylene[4] | 197 | C |
| Ethylene-ethylacrylate[5] copolymer | 130 | C |
| Polystyrene[6] | 112 | C |

[1]Ethylene-vinylacetate copolymer USI UE 614-04 Ultrathene (18% vinylacetate, 150 melt index) made by Quantum Chemical
[2]Cohesive bond failure
[3]USI Petrothene NA 596, 150 melt index made by Quantum Chemical.
[4]Polytac R-1000 made by Crowley Chemical Co.
[5]UCC DPD9169 (19% ethylacrylate, 20 melt index) made by Union Carbide Corp.
[6]Supplied by Amoco Chemical Co.

COMPARATIVE EXAMPLE 2

Hot-melt adhesives from 50 weight percent ethylene-vinylacetate copolymer, Ultrathene USI 612-04 (18% vinyl acetate, 150 melt index), 25 weight percent of three different poly(vinylalkylether)s, and 25 weight percent of the polyterpene Zonarez B-115 were made by hot mixing. Their adhesive properties are set out in Table 2 below.

TABLE 2

| Effect of Change in Vinylether Polymer Type | | |
|---|---|---|
| Vinylether Polymer | Lap shear strength (psi) | Failure Mode |
| Poly(vinylmethylether) | 221 | C |
| Poly(vinylethylether) | 57 | C |
| Poly(vinylisobutylether) | 281 | I[1] |

[1]Interfacial bond failure

EXAMPLE 3

Hot-melt adhesives from 25 weight percent Gantrez M-154 poly(vinylmethylether), 50 weight percent of low density polyethylene (USI Petrothene NA 596 150 melt index) and 25 weight percent of several tackifier resins were made by hot mixing. Their adhesive properties are set out in Table 3 below.

TABLE 3

| Tackifier Resin | Type | Lap Shear Strength (psi) | Failure Mode |
|---|---|---|---|
| Zonarez B-115[1] | Poly(β-pinene) | 256 | C |
| Zonarez B-125[1] | Poly(β-pinene) | 282 | C |
| Zonester 100[1] | Tall Oil Rosin Ester | 137 | C |
| Nevtac 115[2] | Synthetic Polyterpene Resin | 217 | C |
| Nevex 100[2] | Petroleum Hydrocarbon Resin | 100 | C |

[1]Made by Arizona Chemical Co.
[2]Made by Neville Chemical Co.

EXAMPLE 4

Hot-melt adhesives from 25 weight percent Gantrez M-154 poly(vinylmethylether), 50 weight percent of USI UE614-04 Ultrathene ethylene-vinylacetate, and 25 weight percent of several tackifier resins were made by hot mixing. Their adhesive properties are set out in Table 4 below.

TABLE 4

| Tackifier Resin | Type | Lap Shear Strength (psi) | Failure Mode |
|---|---|---|---|
| Zonarez B-115 | Poly(β-pinene) | 221 | C[1] |
| Zonarez B-125 | Poly(β-pinene) | 275 | C |
| Zonester 100 | Tall Oil Rosin Ester | 192 | C |
| Nevtac 115 | Synthetic Polyterpene Resin | 150 | C |
| Nevex 100 | Petroleum Hydrocarbon Resin | 193 | I[2] |

[1]Cohesive
[2]Interfacial

EXAMPLE 5

The effect of changing ethylene-vinylacetate (EVA) percentages and poly(vinylmethylether) (PVME) percentage was evaluated in this Example. No tackifier resin was used. The test data is shown in Table 5 below.

TABLE 5

| % PVME[1] | % EVA[2] | % VA[3] in the EVA | EVA MI[4] | Lap Shear Strength (psi) | Failure Mode |
|---|---|---|---|---|---|
| 0 | 100 | 28 | 388 | 129 | I |
| 20 | 80 | 28 | 388 | 145 | I |
| 33 | 67 | 28 | 388 | 201 | C |
| 50 | 50 | 28 | 388 | 38 | C |
| 0 | 100 | 18 | 150 | 108 | I |
| 25 | 75 | 18 | 150 | 282 | C |
| 25 | 75 | 18 | 530 | 229 | C |

[1]Gantrez M-154
[2]A USI Ultrathene
[3]VA is vinyl acetate
[4]MI is melt index

EXAMPLE 6

The effect of changing the PVME and tackifier resin percentages for hot-melt adhesives containing amorphous polypropylene was evaluated. The data is shown in Table 6 below.

TABLE 6

| % PVME[1] | % Polyterpene[2] | % Amorphous PP | Lap Shear Strength (psi) | Failure Mode |
|---|---|---|---|---|
| 25 | 25 | 50 | 197 | C |
| 35 | 15 | 50 | 64 | C |
| 30 | 30 | 40 | 160 | C |
| 35 | — | 65 | 69 | C |
| 30 | — | 70 | 74 | C |

[1]Gantrez M-154
[2]Zonarex B-115

EXAMPLE 7

The effect of changing the EVA percentage in a hot-melt adhesive made from 25 weight percent Gantrez M-154 PVME, 50 weight percent of a USI Ultrathene EVA, and 25 weight percent Zonarez B-115 tackifier resin is shown in Table 7 below.

TABLE 7

| % EVA in Adhesive | % VA in EVA | Melt Index | Lap Shear Strength (psi) | Failure Mode |
|---|---|---|---|---|
| 50 | 18 | 150 | 221 | C |
| 50 | 28 | 150 | 121 | C |
| 50 | 19 | 32 | 112 | C |
| 40[1] | 18 | 150 | 242 | C |
| 10 | 19 | 2.5 | | |
| 30[1] | 18 | 150 | 108 | I/C |
| 20 | 19 | 2.5 | | |
| 30[1] | 18 | 150 | 119 | C |
| 20 | 19 | 32 | | |
| 30[1] | 18 | 530 | 202 | C |
| 20 | 19 | 2.5 | | |

[1]Two different EVAs with the tabulated properties were used for each hot-melt adhesive made in this preparation.

EXAMPLE 8

Several different hot-melt adhesives were made by hot mixing and used to bond latex-backed carpet to a polypropylene (PP) substrate. The test results on adhesive strength are shown below in Table 8.

TABLE 8

| Adhesive Composition | Load at Failure (psi) | Comments |
|---|---|---|
| 25% PVME/25% Polyterpene[1] 50% Amorphous PP (Polytax R-1000)[2] | 54 | Carpet[3] Failed Before Bond |
| 25% PVME/25% Polyterpene 50% Amorphous PP (Polytac R-1000) | 56[4] | Carpet Failed Before Bond |
| 25% PVME/25% Polyterpene 50% Amorphous PP (Polytac R-500)[2] | 38 | Cohesive Bond Failure |
| 30% PVME 70% Amorphous PP (Polytack R-1000) | 39 | Cohesive Bond Failure |
| 35% PVME 65% Amorphous PP (Polytac R-1000) | 42 | Cohesive Bond Failure |

[1]Zonarez B-115
[2]Polytac R-1000 and R-500 are amorphous polypropylenes supplied by Crowley Chemical Co.
[3]The latex-bonded carpet substrate was supplied by Chrysler Corp.
[4]Structure aged 1 week at 175° F. under a 0.11 psi load.

COMPARATIVE EXAMPLE 9

A hot-melt adhesive using 50 weight percent amorphous polypropylene (Polytac R-1000), 25 weight percent PVME, and 25 weight percent Zonarez B-115 tackifier resin was made by hot mixing and used to bond polyethylene-backed carpet made by Magee Carpet Co. to a polypropylene (PP) substrate. The test results together with results using two commercial hot-melt adhesives are shown in Table 9 below.

TABLE 9

| Adhesive Composition | Load at Failure (psi) | Comments |
|---|---|---|
| 25% PVME/25% Polyterpene 50% Amorphous PP[1] | 40 | PE Backing Failed 3 Times More Frequently Than The Adhesive Bond |
| 100% Amorphous PP[1] | 33 | Interfacial Bond Failure |
| Polyolefin Base[2] | 37 | Interfacial Bond Failure |

[1]This amorphous polypropylene supplied by Baychem International, Inc. as K-TAC 200A.
[2]Jetmelt 3797, a polyolefin-based commercial hot-melt adhesive supplied by 3M.

EXAMPLE 10

A styrene isoprene block copolymer based hot-melt adhesive was prepared from:

10 g poly(vinylmethylether)
20 g petroleum oil (Shellflex 371)
20 g styrene isoprene block copolymer (Kraton I 107)
50 g polyterpene (Zonatac 105 Lite)
1 g antioxidants (0.5 g Irganox 1010 and 0.5 g Butyl Zimate) by hot mixing.

Polyterpene, petroleum oil and antioxidants were added into a tin can. The can was warmed to 165°–170° C. while purging with nitrogen. The mixture was stirred until all ingredients were completely blended. The styrene isoprene block copolymer was then added to the formulation and mixed until blended. Finally, poly(vinylmethylether) was added and stirred until the formulation had again blended.

A control adhesive without PVME was also made by hot mixing 20 wt% Kraton 1107, 20 wt% Shellflex 371 and 60 wt% Zonatac 105 Lite in a process similar to that used above for the styrene isoprene block copolymer bond hot-melt adhesive. Lap shear strength measurements on polypropylene strips bound by the two hot-melt adhesives give values of 62 psi for the control adhesive and 69 for the adhesive modified by PVME.

Peel strength tests were also performed on structures formed by a two step process. First a 3 mil layer of the control or PVME-modified adhesive were cast onto the uncoated side of Kromekote paper using a heated drawdown bar. This paper was then cut into 1 in×5 in strips and bonded to the substrates listed in Table 10 below.

TABLE 10

| Substrate | Peel Strength (pli) | PVME Modified (pli) |
|---|---|---|
| polyethylene 1.5 mil thickness | fiber tear and PE deformation | fiber tear and PE deformation |
| polypropylene 1.5 mil thickness, corona treated | fiber tear | fiber tear |
| aluminum foil 1 mil thickness | fiber tear | fiber tear and aluminum failure |
| glass, 10 mil | fiber tear | 9.5, cohesive | pli = pounds per linear inch

EXAMPLE 11

A styrene butadiene block copolymer based hot-melt adhesive was prepared from:

10 g poly(vinylmethylether)
28 g petroleum oil (Shellflex 371)

16 g styrene butadiene block copolymer (Stemon 840A)

45 g polyterpene (Zonatac 105 Lite)

1 g antioxidants (0.5 g Irganox 1010 and 0.5 g Butyl Zimate) by hot mixing.

Polyterpene, petroleum oil and antioxidants were added into a tin can. The can was warmed to 165°–170° C. while purging with nitrogen. The mixture was stirred until all ingredients were completely blended. The styrene butadiene block copolymer was then added to the formulation and mixed until blended. Finally, poly(vinylmethylether) was added and stirred until the formulation had again blended.

For comparison purposes, a control adhesive without the PVME was made. The control adhesive was made by hot mixing 16 wt% Stereon 840, 28 wt% Shellflex 371 and 55 wt% Zonatac 105 Lite.

Peel strength tests were also performed on structures formed by a two step process. First a 3 mil layer of the control or PVME-modified adhesive were cast onto the uncoated side of Kromekote paper using a heated drawdown bar. This paper was then cut into 1 in×5 in strips and bonded to the substrates listed in Table 11 below.

TABLE 11

| Substrate | Control Strength (pli)[1] | PVME Modified Peel Strength (pli) |
|---|---|---|
| polyethyelene 1.5 mil thickness | brittle peel, variable strength | fiber tear and PE deformation |
| polypropylene 1.5 mil, thickness corona treated | 3.5, fiber tear | fiber tear |
| aluminum foil 1 mil thickness | 4.8, cohesive | 5.1, cohesive |
| glass, 10 mil thickness | fiber tear | 8.1, cohesive |

[1] pli = pounds per linear inch

EXAMPLE 12

The effect of PVME proportion on the properties of the adhesive was evaluated for adhesives containing 33 parts ethylene-vinyl acetate (ELVAX 250), 33 parts Shellwax 300 and 33 parts of Wingtack Plus. The results of peel tests on the adhesives bonded to various substrates are shown below in Table 12.

TABLE 12

| PVME (%) | Peel Strength[1] Polypropylene Treated | Peel Strength[1] Polypropylene Untreated | Peel Strength[1] Polyethylene (Untreated) | Peel Strength[1] Aluminum |
|---|---|---|---|---|
| 0 | 20 | 20 | 25 | 200 SS[4] |
| 10 | 35 | 40 | 60 B[3] | 300 SS |
| 20 | 100 B | 150 B | 70 B | 250 S[5] |
| 30 | 120 SS | 250 SS | 60 SS | 300 S |

[1] units of pounds per linear inch
[2] treated by corona discharge
[3] brittle
[4] soft
[5] semi-soft

COMPARATIVE EXAMPLE 13

A control adhesive made from 65 g of Rexene 2730 and 35 g of Wingtack Plus and a PVME adhesive made from 65 g of Rexene 2730, 20 g of Wingtack Plus, and 15 g of PVME were applied to a number of substrates and strength tested. The results are set out below in Table 13.

TABLE 13

| Substrate[1] | Control Adhesive Peel Strength (pli) | PVME Adhesive Peel Strength (pli) |
|---|---|---|
| Polyethylene | PE deformed (4.3) | PE deformed (4.5) |
| Polypropylene | fiber tear | fiber tear |
| Mylar | fiber tear | 3.7 - soft peel - cohesive |
| EVA | fiber tear | fiber tear |
| Aluminum | 3.5 - soft peel - cohesive | 4.4 - soft peel - cohesive |
| Kraft Paper | 1.8 - soft peel - cohesive | fiber tear (Kraft) |
| Glass | fiber tear | fiber tear |

[1] All bonds were made between the uncoated side of Kromekote and the substrate listed.

COMPARATIVE EXAMPLE 14

A control adhesive made from 33 g of Elvax 250, 23 g of Shellwax 300, 10 g of Castorwax, and 33 g of Wingtack Plus and PVME adhesive made from 33 g of Elvax 250, 23 g of Shellwax 300, 10 g of Castorwax, 23 g of Wingtack Plus, and 10 g of PVME was applied to a number of substrates and Kronekote (Krone) paper and strength tested. The results are set out below in Table 14.

TABLE 14

| Substrate[1] | Control Adhesive Peel Strength (pli) | PVME Adhesive Peel Strength (pli) |
|---|---|---|
| Polyethylene | 0.2 - brittle @ PE[2] | 1.1 - semi-brittle @ PE[2] |
| Polypropylene | 0.1 - semi-brittle @ PP[3] | 0.2 - semi-soft @ PP |
| Mylar | 0.0 - brittle @ Mylar[4] | 0.1 - brittle @ Mylar |
| EVA | 0.2 - semi-brittle @ EVA[5] | 0.5 - semi-brittle @ EVA |
| Aluminum | 0.4 - semi-soft @ Alum.[6] | 0.5 - semi-soft @ Alum. |
| Kraft Paper | fiber tear (Krome) | fiber tear (Kraft) |

TABLE 14-continued

| Substrate[1] | Control Adhesive Peel Strength (pli) | PVME Adhesive Peel Strength (pli) |
|---|---|---|
| Glass | fiber tear | fiber tear |

[1] All bonds were made between the uncoated side of Kromekote paper and the substrate listed.
[2] Type of bond failure at the adhesive polyethylene interface.
[3] Adhesive-polypropylene interface
[4] Adhesive-mylar interface
[5] Adhesive-EVA interface
[6] Adhesive-aluminum interface

What is claimed is:

1. A hot-melt adhesive composition having a melt viscosity in the range of about 100 to about 150,000 centipoise at 177° C. useful for binding polyethylene, polypropylene, and ethylene-propylene copolymers comprising at least about 10 percent by weight of substantially amorphous poly(vinylmethylether), at least about 20 percent by weight of a tackifier resin having a softening point above about 75° C., and at least about 50 percent by weight of a thermoplastic resin selected from the group consisting of amorphous $C_3$ to $C_6$ olefins homopolymers, amorphous copolymers consisting of $C_2$ to $C_6$ olefins, and low density polyethylene.

2. The hot-melt adhesive of claim 1 wherein the thermoplastic resin is an amorphous $C_3$ to $C_6$ olefin homopolymer or an amorphous copolymer consisting of $C_2$ to $C_6$ olefins.

3. The hot-melt adhesive of claim 1 wherein the thermoplastic resin is a low density polyethylene.

4. A hot-melt adhesive composition having a melt viscosity in the range of about 100 to about 150, 000 centipoise at 177° C. useful for binding polyethylene, polypropylene, and ethylene-propylene copolymers comprising at least about 10 percent by weight of substantially amorphous poly(vinylmethylether) at least about 10 percent by weight of a tackifier resin having a softening point above about 75° C., and at least about 50 percent by weight of a thermoplastic resin which is amorphous polypropylene or amorphous polypropylene containing up to about 20 weight percent of crystalline polypropylene.

5. A hot-melt adhesive composition having a melt viscosity in the range of about 100 to about 150,000 centipoise at 177° C. useful for binding polyethylene, polypropylene, and ethylene-propylene copolymers, whose surfaces have not been pretreated to improve adhesion, comprising at least about 10 percent by weight of substantially amorphous poly(vinylmethylether), at least about 20 percent by weight of a tackifier resin having a softening point above about 75° C., and at least about 50 percent by weight of a thermoplastic resin selected from the group consisting of amorphous $C_3$ to $C_6$ olefins homopolymers, amorphous copolymers consisting of $C_2$ to $C_6$ olefins, and low density polyethylene.

6. A hot-melt adhesive composition according to claim 1 wherein the amount of tackifier resin is at least about 25 weight percent.

7. A hot-melt adhesive composition according to claim 1 wherein the amount of tackifier resin is at least about 30 weight percent.

8. The composition of claim 1 wherein the tackifier resin is selected from the group consisting of terpene resins, terpene-phenol resins, coumarone-indene resins, aliphatic and aromatic petroleum resins, hydrogenated petroleum resins, resins made by copolymerization of pure aromatic monomers, a wood rosin, and wood rosin esters.

9. The composition of claim 1 wherein the tackifier resin is selected from the group consisting of terpene resins, terpene-phenol resins, coumarone-indene resins, aliphatic and aromatic petroleum resins, hydrogenated petroleum resins, resins made by copolymerization of pure aromatic monomers, a wood rosin, and wood rosin esters.

10. The composition of claim 1 wherein the tackifier resin is selected from the group consisting of terpene resins, terpene-phenol resins, coumarone-indene resins, aliphatic and aromatic petroleum resins, hydrogenated petroleum resins, resins made by copolymerization of pure aromatic monomers, a wood rosin, and wood rosin esters.

11. The composition of claim 1 wherein the tackifier resin is selected from the group consisting of terpene resins, terpene-phenol resins, coumarone-indene resins, aliphatic and aromatic petroleum resins, hydrogenated petroleum resins, resins made by copolymerization of pure aromatic monomers, a wood rosin, and wood rosin esters.

* * * * *

UNITED STATES PATENT AND TRADEMARK OFFICE
CERTIFICATE OF CORRECTION

PATENT NO.: 5,359,006

DATED: October 25, 1994

INVENTOR(S): Matthew A. Kulzick, Wayne R. Pretzer, Tsuei-Yun Lynch, Paul A. Koning It is certified that error appears in the above-identified patent and that said Letters Patent is hereby corrected as shown below:

| Col. | Line | |
|------|------|---|
|      |      | in the title, the printed patent reads "Poly(Vinylalkylether)-Containing Hot Melt Adhesives For Polyethllene And Polypropylene" the title should read --Poly(Vinylalkylether)-Containing Hot Melt Adhesives For Polyethylene And Polypropylene-- |
| 1    | 24-5 | "a bond between two minerals by cooling of the molten adhesive" should read --a bond between two materials by cooling of the molten adhesive-- |
| 2    | 24   | "29 dynes/cm and 67 values of 7.7-9.2," should read --29 dynes/cm and $\delta$ values of 7.7-9.2,-- |
| 4    | 47   | "Sheliwax 200," should read --Shellwax 200,-- |
| 7    | 38   | "mineral spidts," should read --mineral spirits,-- |

UNITED STATES PATENT AND TRADEMARK OFFICE
CERTIFICATE OF CORRECTION

PATENT NO.: 5,359,006

DATED: October 25, 1994

INVENTOR(S): Matthew A. Kulzick, Wayne R. Pretzer, Tsuei-Yun Lynch, Paul A. Koning It is certified that error appears in the above-identified patent and that said Letters Patent is hereby corrected as shown below:

| Col. | Line | |
|---|---|---|
| 9 | 9 | "Vadous hot-melt adhesives" should read --Various hot-melt adhesives-- |

Signed and Sealed this

Twenty-eight Day of February, 1995

Attest:

BRUCE LEHMAN

Attesting Officer

Commissioner of Patents and Trademarks